July 17, 1962 H. C. ALLEN 3,044,555
FUSIBLE LINK
Filed Dec. 28, 1959
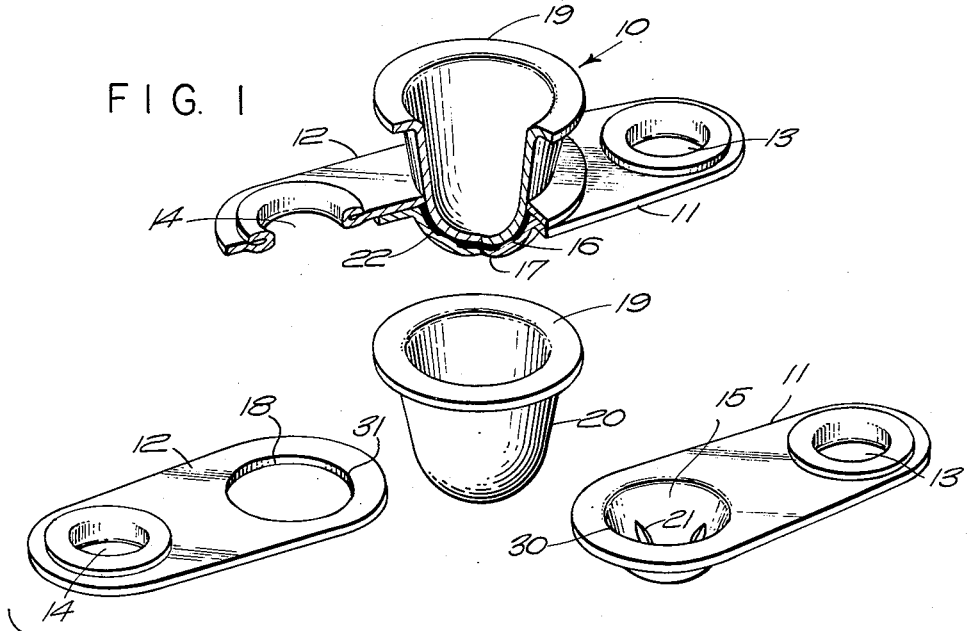
FIG. 1
FIG. 2
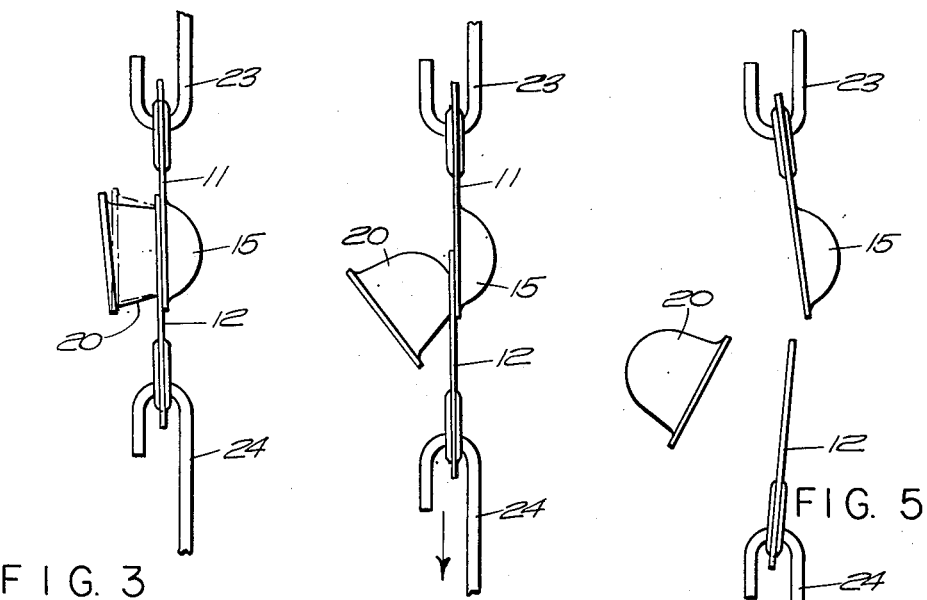
FIG. 3
FIG. 4
FIG. 5
INVENTOR.
HARRY C. ALLEN
BY
David R. McKenney
ATTORNEY

United States Patent Office 3,044,555
Patented July 17, 1962

3,044,555
FUSIBLE LINK
Harry C. Allen, North Scituate, R.I., assignor to Grinnell Corporation, Providence, R.I., a corporation of Delaware
Filed Dec. 28, 1959, Ser. No. 862,344
6 Claims. (Cl. 169—42)

This invention relates to an improved fusible link.

Fusible links, to wit, links made of members united by solder which will melt at a predetermined temperature, are well known and understood by those skilled in the art. So also is their use for holding firedoors, skylights and various other devices.

The history of the development of fusible links indicates that the most elementary form of link was one consisting of two plates joined in overlapping relation by a fusible solder. Such a link though quick acting had a basic deficiency, namely extremely poor cold strength characteristics. When subjected to continuous load under temperatures, which, though considered fairly high were still well below the fusion temperature of the solder, this link would part and falsely actuate the device to which it was fastened.

In an effort to overcome this defect the link was modified to contain some sort of a locking feature to increase the cold working strength of the link. These locking features have taken different forms, for example, keying the plates together or utilizing a fusible rivet or rivets to join the plates. The result of using such modifications to increase the cold strength of the link has been to also increase the reaction time in which the link operated. For example, those links which utilized a fusible rivet to increase their cold strength were not as sensitive to heat as the simple link because the use of only one rivet necessitated that it be quite large in diameter thereby requiring a longer time for the heat to reach its center and to melt the rivet. To meet this situation a plurality of smaller diameter rivets have been used, but this has not completely solved the problem because the rivets are not heated uniformly with the result that some rivets do not melt as quickly as others causing the action of the link to be hindered to an extent.

Another way of attacking the problem of poor cold strength has been to insert some sort of locking device such as a key in matching grooves in the plates to prevent the plates from slipping before the solder was melted. A construction analagous to the keyed link was one having interfitting indentations or grooves in the adjoining plates. These solutions though bringing about a stronger link also brought about a slower link because each of these links to operate effectively required that the plates, upon melting of the solder, be pried apart perpendicularly to their plane surfaces a sufficient distance to pass the obstruction formed by either the key or the indentation. But, this type of link action cannot occur immediately because the solder when it melts at the designated temperature does not permit the immediate separation of the plates due to the pull exerted by the surface tension of the liquified solder between the plates. Thus, additional time is required before the load on the link can operate to overcome the added force introduced by the surface tension of the liquid solder.

Another problem which has existed for many years, though possibly it has not been recognized, was that of orientation of the link with respect to convection air currents. Because of the nature of the use to which a link is put it is difficult to install a link with any control over the way it will remain during its useful life. To those without skill in the art orientation of a link may have little or no significance but during a fire when every second can be vitally important to the saving of lives and property the orientation of the link may have some importance.

It is well known that heat rises. Should it rise past a link the link will separate when its temperature is raised to the melting point of the solder in the link. Fire protection engineers have recognized that if a link were placed in the path of rising hot air with its large flat surfaces perpendicular to the path of the hot air, separation would occur in less time than if the link were oriented edge on, with the surfaces parallel to the flow of air. The reason is quite obvious, whereas in the first case all of the heat is transmitted to the solder at the same time because the large surface upon which the hot air impinges is directly in contact with the solder, the latter example requires that a major portion of the heat be conducted from the lower edge to the solder, this edge being the only portion directly exposed to the heat. Those surfaces directly in contact with the solder receive only a wiping action from the rising hot air which is not as effective in transferring heat to these surfaces as direct impingement. Thus, some difference in the actuating time does occur.

It is an object of my present invention to provide a fusible link wherein the link members are locked together to provide stability under load during unheated periods and wherein the parts of the link become separated very quickly upon the fusing of a fusible binding substance which unites the members of the links.

Another object is to provide a fusible link having a locking device which has ready access to the space outside the confines of the link.

A further object is to provide a fusible link having a locking device which does not require that the plates of the link move apart perpendicularly to their adjoining surfaces.

A still further object is to provide a fusible link having a locking device which can be excreted from the link at a predetermined temperature and thus permit the link to slidingly separate.

Still another object is to provide a link having a locking device which is constructed to function as a heat collector thereby lessening the disadvantage of having the link oriented edgewise to a hot air stream.

An additional object is to provide a link with a heat collecting locking member wherein a major portion of the locking member protrudes at right angles to the broad surface of the link and exposes a much greater surface area to a rising stream of hot air than the lower edge of the link.

With reference to the attached drawings which depict the preferred embodiment of my invention;

FIG. 1 is a sectional perspective view of my link;

FIG. 2 is an exploded view of my link showing the relationship of the parts thereof;

FIG. 3 is a diagrammatic elevational view showing the link beginning to separate under desired temperature and load conditions with relation to its initial position shown in dotted lines;

FIGS. 4 and 5 show the action of the link as continued from FIG. 3.

Referring more particularly to the drawings, 10 indicates in general my fusible link which is made up of two plate elements 11 and 12 in overlapping relationship. Each of these elements contains an eye 13 and 14 respectively to receive an appropriate holding device. Near the end of element 11 opposite to eye 13 is a depression or intent 15 having walls 16 and a bottom portion 17. Superimposed over the indent is a hole 18 through element 12 at the end opposite to that of eye 14. Inserted through said hole 18 and into said depression 15 is a thimble shaped or bell shaped element 19 having inwardly sloping walls 20 which generally conform to the walls of said depression 15. This element 19 is spaced from the interior surface of the depression 15 by a number of small bosses 21 which maintain the proper distance between the thimble shaped element and the inner surface depression to insure the best bond between these two elements by a solder film 22. Where increased cold retentive strength is desired, additional solder may be placed between the abutting flat portions of elements 11 and 12. It will be apparent to those skilled in the art that with the proper selection of the angle of taper, the sides of the indent and locking member of this invention need not be limited to a construction having a rounded bottom.

The operation of the link is as follows:

The link is normally installed between two fastening devices, shown here as hooks 23 and 24, of a holding member which is usually under a tensile load and which, when the link parts, permits a closure to occur. One normal orientation of the link is depicted by FIGURE 3 of the drawing and the dotted portion thereof. During a fire, as the hot air rises it will be intercepted by the lower edge of the plate engaged by hook 24, and the outwardly extending open portion of member 19. As a result heat will be conducted to the base of the member 19, the adjacent solder and the surrounding portions of the link but at a faster rate from the member 19 than from the lower edge portion. Eventually the temperature will reach a point at which melting of the solder will occur. When this happens, a minute movement will take place between elements 11 and 12 because of the load on the link, causing stress to be transferred from the edge portion 30 of the opening 15, and the edge portion 31 of hole 18, to the tapered sides 18 of the element 12. Because the sides are tapered any stress imposed on the element 19 by plate elements 11 and 12 has an outward component which will urge the element 19 out of the opening 15. At the same time, because the plate elements 11 and 12 are not in line the force imposed on element 19 by edges 30 and 31 takes the form of a couple which will urge the element 19 to rotate out of indent 15 at the same time that it is being urged out by the outward components described above. Upon this occurrence, the link will separate aided by the lubricating property of the molten solder. This action is progressively shown in FIGURES 3, 4 and 5.

It is thus seen that during separation of the link a shear or sliding action is emphasized between all the components. This action is further enhanced by the molten solder which acts as a lubricant between the moving parts in contradistinction to the retarding action of the capillary forces of the molten solder in some of the prior art devices described above.

It will be apparent to those skilled in the art that deviations from the above described preferred embodiment may be presented which are encompassed within my invention as claimed below.

I claim:

1. A fusible link comprising a pair of plate elements, one of said elements having an opening with depressed sides therein, the depressed sides tapering inwardly toward each other, the other of said elements having a hole therethrough in register with said opening, a separate locking member extending through said hole into said opening and maintaining said elements in overlapping relation, said locking member having tapering sides substantially conforming in shape to the depressed sides of said opening, means fusible at a predetermined temperature for retaining said member in said depression, said means upon fusion at said predetermined temperature thereby permitting said member to be ejected through said hole and the elements to separate when said link is subjected to a desired load.

2. A fusible link as defined in claim 1 in which the locking member is hollow.

3. A fusible link as defined in claim 2 in which the hollow locking member has a substantially large portion outside the confines of the link.

4. A fusible link comprising a pair of plate elements, one of said elements having a depression therein, the sides of said depression coming together inwardly toward the bottom of said depression, the other of said elements having a hole therethrough in register with the mouth of said depression, a separate locking member extending through said hole into said depression and maintaining said elements in overlapping relation, said locking member having sides conforming in shape to the sides of said depression, means fusible at a predetermined temperature for retaining said member in said depression, said means upon fusion at said predetermined temperature thereby permitting said member to be ejected through said hole and the elements to separate when said link is subjected to a desired load.

5. A fusible link as defined in claim 4 in which the locking member is hollow.

6. A fusible link comprising a pair of plate elements and a separate hollow locking member, one of said elements having a cup-like depression therein, the other of said elements having a hole therethrough in register with the mouth of said depression, said locking member having a large portion outside the confines of said link and tapering sides and a cup-like bottom conforming to the shape of said depression and extending through said hole into said depression and maintaining said elements in overlapping relation, solder fusible at a predetermined temperature retaining said member in said depression, said solder upon melting at said predetermined temperature permitting said member to be ejected through said hole and the elements to separate when said link is subjected to a desired load.

References Cited in the file of this patent

UNITED STATES PATENTS

| | | |
|---|---|---|
| 277,479 | Grinnell | May 15, 1883 |
| 1,145,883 | Emmett | July 13, 1915 |
| 1,298,109 | Siver | Mar. 25, 1919 |
| 1,379,195 | Lewis | May 24, 1921 |
| 2,151,982 | Loepsinger et al. | Mar. 28, 1939 |
| 2,378,273 | Wilhelm | June 12, 1945 |